United States Patent
Tang et al.

(10) Patent No.: US 7,252,866 B2
(45) Date of Patent: Aug. 7, 2007

(54) THERMOPLASTIC FILM FOR A DISPOSABLE CONTAINER MADE OF EXPANDABLE THERMOPLASTIC PARTICLES

(75) Inventors: Jiansheng Tang, Mars, PA (US); Jeffory E. Russell, Sewickley, PA (US); David Allen Cowan, Cranberry Township, PA (US); Michael T. Williams, Beaver Falls, PA (US); Dennis H. Piispanen, Beaver, PA (US); John C. Kwok, Moon Township, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

(21) Appl. No.: 10/325,062

(22) Filed: Dec. 20, 2002

(65) Prior Publication Data

US 2004/0121101 A1  Jun. 24, 2004

(51) Int. Cl.
*B29D 22/00* (2006.01)
*B29D 23/00* (2006.01)
*B32B 1/08* (2006.01)

(52) U.S. Cl. .................. 428/36.5; 428/35.7; 428/304.4; 428/308.4; 428/318.6; 428/402

(58) Field of Classification Search ............... 428/36.5, 428/36.9, 36.91, 35.7, 304.4, 308.4, 313.3, 428/318.4, 318.6, 334, 402, 500, 515
See application file for complete search history.

(56) References Cited

U.S. PATENT DOCUMENTS

| | | | |
|---|---|---|---|
| 3,619,344 A | * | 11/1971 | Wolinski et al. ......... 428/314.4 |
| 4,036,675 A | | 7/1977 | Amberg et al. |
| 4,206,249 A | | 6/1980 | Suzuki et al. |
| 4,435,344 A | | 3/1984 | Iioka |
| 4,528,221 A | * | 7/1985 | Komatsuzaki et al. ..... 428/36.5 |
| 4,698,367 A | | 10/1987 | Ikeda et al. |
| 4,703,065 A | | 10/1987 | Sonnenberg |
| 4,720,429 A | | 1/1988 | Sonnenberg |
| 4,782,022 A | | 11/1988 | Puhler et al. |
| 4,798,749 A | | 1/1989 | Arch et al. |
| 5,145,107 A | | 9/1992 | Silver et al. |
| 5,490,631 A | | 2/1996 | Iioka et al. |
| 5,725,916 A | | 3/1998 | Ishii et al. |
| 6,136,396 A | | 10/2000 | Gilmer |
| 6,277,491 B1 | | 8/2001 | Sakoda et al. |
| 6,416,829 B2 | | 7/2002 | Breining et al. |

FOREIGN PATENT DOCUMENTS

GB   1407964   * 10/1975

* cited by examiner

*Primary Examiner*—Michael C. Miggins
(74) *Attorney, Agent, or Firm*—Gary F. Matz; Suzanne Kikel

(57) ABSTRACT

A foam thermoplastic container e.g. cup, bowl molded from expandable thermoplastic particles e.g. expandable polystyrene, has a film made of a thermoplastic resin e.g. solid polystyrene, rubber-modified polystyrene, PET, polyethylene, polypropylene, fused to its inner sidewall surface by heat and pressure to create a barrier to resist the leakage of liquid and food with oil and/or fatty components and to increase the rim strength of the container. The thermoplastic resin film can be fused to the outer surface of the container for printing purposes and/or to create a barrier and/or can be fused to the base surfaces of the container. The molding machine used to form the foam container is used to fuse the film to the container.

9 Claims, No Drawings

THERMOPLASTIC FILM FOR A DISPOSABLE CONTAINER MADE OF EXPANDABLE THERMOPLASTIC PARTICLES

BACKGROUND OF THE INVENTION

1. Field of the Invention

The present invention relates to a disposable container. More particularly, the present invention relates to a thermoplastic film, which is heat and pressure fused to the inner and/or outer surfaces of the sidewall of a thermoplastic container, and optionally, to the inner and/or outer surfaces of container's base. The container is generally pre-formed via a molding process from expandable thermoplastic particles, e.g. expandable polystyrene particles (EPS). The container is used for holding liquids, such as coffee or foods containing oil and/or fat components such as precooked fat-containing foods, e.g. instant noodles, soups, fried chicken, and the like.

2. Background Art

The manufacture of molded articles, such as containers, i.e. cups, bowls, etc. from expanded thermoplastic particles is well known. The most commonly used thermoplastic particles are expandable polystyrene particles known as EPS. Typically, polystyrene beads are impregnated with a blowing agent, which boils below the softening point of the polystyrene and causes the impregnated beads to expand when they are heated.

The formation of molded articles from impregnated polystyrene beads is generally done in two steps. First, the impregnated polystyrene beads are pre-expanded to a density of from about 2 to 12 pounds per cubic foot. Second, the pre-expanded beads are heated in a closed mold to further expand the pre-expanded beads to form a fused article having the shape of the mold.

The expandable polystyrene particles used to make foam containers are generally prepared by an aqueous suspension polymerization process, which results in beads that can be screened to relatively precise bead sizes. Typically, bead diameters are within the range of from about 0.008 to about 0.02 inch. Occasionally, cups are made from particles having bead diameters as high as 0.03 inches.

In spite of careful bead size control, one problem, which continues to plague the container industry, is that after a period of time the EPS containers have a tendency to leak coffee or the oil and/or fat components in food substances carried by the containers. That is, the coffee or the oil and/or fat permeate around the fused polystyrene beads onto the outer surface of the sidewall of the container. The result can be an unsightly stain on the outer surface of the sidewall of the container and/or inconvenience to the holder of the container.

Several approaches have evolved over the years directed toward the reduction of leakage in these containers for retaining liquids and/or pre-cooked foods.

Amberg et al., U.S. Pat. No. 4,036,675 discloses a container made from foamed plastic material, preferably foamed polystyrene, which is lined on one or both sides with unoriented polyolefin film, preferably polypropylene. The film is secured to the foamed plastic base material using as a heat-sensitive adhesive a vinylic polymer or polyamide resin. The film is coated with a wet adhesive and dried before laminating the film to the foam material. Laminating is done by heating the foam material to 250-275° F., pre-heating the coated film to 100-180° F., and pressing the coated film surface against the heated foam using a cold platen or roller for 10 to 15 seconds.

Sonnenberg U.S. Pat. Nos. 4,703,065 and 4,720,429 disclose thermoplastic polymer foam cups for retaining coffee that are molded from thermoplastic polymer particles whose surfaces are coated with a fluorosurfactant before molding.

Sonnenberg U.S. Pat. No. 4,785,022 discloses a method for enhancing the coffee retention of molded foam cups, which involves coating the expandable polystyrene particles with various rubber polymers and copolymers. The rubber useful in the invention can be selected from the group consisting of polybutene, polyisobutylene, isobutylene-butene copolymer and butene-ethylene copolymer.

Arch, et al. U.S. Pat. No. 4,798,749 approaches the problem of coffee leakage by replacing conventional blowing agents such as butanes, n-pentane, hexanes, and the halogenated hydrocarbons with isopentane in the expandable styrene polymer particles.

Ikeda, et al., U.S. Pat. No. 4,698,367 discloses expandable thermoplastic resin particles in which the thermoplastic resin in which a copolymer composed of a fluorinated vinyl polymer part and a hydrophilic vinyl polymer part covers or is included on the surface or in the surface layer of the expandable thermoplastic particle. These resin particles are useful for producing package containers for oily or fatty foods.

Sakoda et al., U.S. Pat. No. 6,277,491 B1 is directed to the prevention of oil from penetrating into a vessel obtained from expandable thermoplastic resin beads through molding. This is achieved by coating the surface of the resin beads or incorporating the resin beads with a fluorine-containing block copolymer comprising a fluorine-containing vinyl-type polymer segment derived from a fluorine-containing vinyl-type monomer and a lipophilic vinyl-type polymer segment derived from a lipophilic vinyl-type monomer.

The containers of the above prior art are generally addressed to polystyrene containers, such as cups or bowls. The following patents pertain to paper cups that are either spray coated or that contain a thermoplastic resin film either for heat insulating purposes or for producing a high impermeability to liquids.

For example, Suzuki et al., U.S. Pat. No. 4,206,249 discloses a process for producing a paper container having high impermeability to liquid which comprises spray coating a polymerizable solution containing a prepolymer onto a wall surface of a previously fabricated paper container and irradiating the coated wall with ultraviolet light to effect the setting of the prepolymer on the wall surface of the container. This forms a coating, which is impermeable to liquids, such as water, milk, soft drinks, oils, etc. This '249 patent also teaches in column 2, lines 45-62, that there is a lining method in which the interior wall surface of the container is lined with a thermoplastic film. The thermoplastic film is first laminated onto a blank and the blank is formed into a container.

Iioka, U.S. Pat. No. 4,435,344 discloses a heat-insulating paper container where the outer and inner surfaces of the body member are extrusion coated or laminated with a thermoplastic synthetic resin film. The resin film is converted into a foamed layer on the paper substrate and then the container is formed. The result is a container with good thermo-insulation properties. This film preferably is polyethylene but as taught in column 3, lines 50 -55, this resin film can be polypropylene, polyvinyl chloride, polystyrene, polyester, nylon and the like.

Iioka et al., U.S. Pat. No. 5,490,631 discloses a heat insulating paper container comprising a body member wherein a thick foamed heat insulating layer is made of a thermoplastic synthetic resin film is formed in the printed area of the outer surface and a less thick foamed heat-insulating layer that can be made of the same thermoplastic synthetic resin film is formed in the non-printed area of the outer surface. The thermoplastic synthetic resin film is typically polyethylene.

Breining, et al., U.S. Pat. No. 6,416,829 B2 discloses a heat insulating paper cup where the body member is coated on its outside surface with a foamed low density polyethylene, and on its inside surface with an unfoamed modified low density polyethylene.

None of the containers of the prior art have a thin thermoplastic film fused to the inner and/or outer surfaces of a foam molded container for retaining food items such as coffee, soups, meats, and the like for the purpose of reducing the penetration of the liquid and/or the oil or fatty components in these food items through the foam container.

SUMMARY OF THE INVENTION

The invention relates to a container suitable for use in retaining hot liquids such as coffee or water added to food items such as instant soups and/or stews. A foam molded container made from expandable thermoplastic particles is formed and an extruded or blown thin thermoplastic film is encircled at least around the inside of the container, and the film is heat fused onto the inner surface of the sidewall of the container. Optionally, a thin thermoplastic film can be encircled around and heat fused onto the outer surface of the sidewall of the container, and optionally, a film can be heat fused to the inner and/or outer surfaces of the base of the container. The resultant container is impervious to leakage and/or stains caused by liquids and/or oily and fatty foods. The film around the outer surface of the sidewall of the container can also be used for labeling and printing purposes.

The thermoplastic film is made of a polymer selected from the group consisting of solid polystyrene, rubber modified polystyrene, polymethyl methacrylate, rubber-modified polymethyl methacrylate, polypropylene, polyethylene, polyethylene terephthalate (PET), and mixtures thereof. Additionally, one or more of these polymers can be blended with a styrene/maleic anhydride copolymer.

In the preferred embodiments of the invention, the polymer for the thermoplastic film is selected from the group consisting of solid polystyrene and rubber-modified polystyrene, i.e. a medium impact polystyrene resin and a high impact polystyrene resin. The high impact polystyrene appears to give the best results. The thickness of the thermoplastic film ranges from about 0.10 mil to about 5.0 mils, and preferably is about 1.0 mil, and extends substantially the depth of the container around the inner and/or outer surfaces of the sidewall of the container.

Preferably, the thermoplastic film is fused to the inner and/or outer surfaces of the sidewall of the foam container via the same molding equipment used to form the foam container. The thermoplastic film can optionally be fused to the inner and/or outer surfaces of the base of the formed container.

The foam molded container is made of expandable thermoplastic resin beads, and in the preferred embodiments, this expandable thermoplastic resin is expandable polystyrene particles (EPS).

It is an object of the present invention to provide a thermoplastic foam container that exhibits improved resistance to leakage and/or stain, and improved mechanical properties, such as improved rim strength and surface hardness of the container.

It is a further object of the present invention to provide a thermoplastic film fused to at least the inner surface of the sidewall of a formed foam container by heat and pressure, and optionally can be fused to the outer surface of the sidewall and/or to the surfaces of the base of the container.

It is still a further object of the present invention to provide a thermoplastic container that is suitable for receiving hot liquids, such as coffee, hot water for instant soups, stews, etc. and which thermoplastic container with its contents can be reheated in a microwave.

DETAILED DESCRIPTION OF THE INVENTION

In the invention, a foam container, e.g., cups, bowls, and the like is molded from expandable thermoplastic particles. These expandable thermoplastic particles are made from any suitable thermoplastic homopolymer or copolymer. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer with monomers such as divinylbenzene, butadiene, alkyl methactylates, alkyl acrylates, acrylonitrile, and maleic anhydride, wherein the vinyl aromatic monomer is present in at least 50% by weight of the copolymer. Styrenic polymers are preferred, particularly polystyrene. However, other suitable polymers may be used, such as polyolefins (e.g. polyethylene, polypropylene), and polycarbonates (polyphenylene oxides, and mixtures thereof.

In the preferred embodiments, the expandable thermoplastic particles are expandable polystyrene (EPS) particles. These particles can be in the form of beads, granules, or other particles convenient for the expansion and molding operations. Particles polymerized in an aqueous suspension process are essentially spherical and are preferred for molding the foam container of the invention. These particles are screened so that their size ranges from about 0.008 to about 0.02 inch.

These expandable thermoplastic particles are impregnated using any conventional method with a suitable blowing agent. For example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692 to D. Alelio. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC'S, which boil at a temperature below the softening point of the polymer chosen. Mixtures of these aliphatic hydrocarbons blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 assigned to NOVA Chemicals (International) S.A. In these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated thermoplastic particles are generally pre-expanded to a density of from about 2 to about 12 pounds per cubic food. The pre-expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175 to Rodman.

The impregnated thermoplastic particles can be foamed cellular polymer particles as taught in Arch et al. U.S. patent application Ser. No. 10/021,716 assigned to NOVA Chemicals Inc, the teachings of which are incorporated herein by reference. The foamed cellular particles are preferably polystyrene that are pre-expanded to a density of from about 12.5 to about 34.3 pounds per cubic foot, and contain a volatile blowing agent level less than 6.0 weight percent, preferably ranging from about 2.0 wt % to about 5.0 wt %, and more preferably ranging from about 2.5 wt % to about 3.5 wt % based on the weight of the polymer.

In a conventional manner, the pre-expanded particles or "pre-puff" are heated in a closed mold to further expand the pre-puff and to form the container of the invention.

The thermoplastic film is made of a polymer selected from the group consisting of solid polystyrene, rubber modified polystyrene, polymethyl methacrylate, rubber-modified polymethyl methacrylate, polypropylene, polyethylene, polyethylene terephthalate (PET), and mixtures thereof. Additionally, one of the preceding polymers can be blended with a styrene/maleic anhydride copolymer. In the preferred embodiments of the invention, the polymer for the thermoplastic film is selected from the group consisting of solid polystyrene and rubber-modified polystyrene, i.e. a medium impact polystyrene resin and a high impact polystyrene resin.

Polystyrene is a high molecular weight linear polymer produced by polymerizing styrene. When made from only the styrene monomer, the resulting polymer has a glass transition temperature of about 100° C. and is brittle, showing very poor strength i.e. elongation to rupture characteristics. It is known that the strength characteristics can be improved by incorporating rubber modifiers, such as butadiene rubber, which product is referred to as a medium impact polystyrene or a high impact polystyrene (HIPS), depending on the weight percent of rubber polymer incorporated into the styrene. For the medium impact polystyrene, the polystyrene ranges from about 95 to 98 weight percent and the rubber polymer ranges from about 2 to about 5 weight percent, based on the weight of the polystyrene resin. For the high impact polystyrene, the polystyrene ranges from about 85 to about 95 weight percent and the rubber polymer ranges from about 5 to about 15 weight percent, based on the weight of the polystyrene resin.

The process for making "HIPS" is well known to those skilled in the art. Such known processes are exemplified in U.S. Pat. No. 3,903,202 and U.S. Pat. No. 4,146,589, the teachings of which are incorporated herein by reference. The rubber is "dissolved" in the styrene monomer (actually the rubber is infinitely swollen with the monomer). The resulting "solution" is fed to a reactor and with the use of a suitable initiator system polymerization occurs typically under shear. During the polymerization, the styrene is grafted to the rubber. The grafting is thought to be necessary to provide the higher modulus and impact strength, as compared to simple blends of polystyrene and butadiene rubbers. When the conversion of the styrene is about equal to the weight percent of the rubber in the system the phases invert, i.e. the styrene/styrene polymer phase becomes continuous and the rubber phase becomes discontinuous. After phase inversion the polymer is finished in a manner essentially similar to that for finishing polystyrene.

Preferably, the amount of rubber used in the high impact polystyrene film of the invention is about 8 weight percent and that used in medium impact polystyrene film is about 3 weight percent, based on the weight of the polystyrene resin.

Suitable rubbers for modifying the polystyrene are natural rubber, polybutadiene and its copolymers with styrene or other comonomers, i.e. styrene-butadiene copolymer rubber, polyisoprene and its copolymers with styrene or other comonomers, acrylic rubbers, EPDM rubbers, polybutylene and so on. Preferably, the rubber is polybutadiene or styrene-butadiene copolymer rubber.

The particle distribution of the rubber in the polystyrene matrix is preferably unimodal. The average rubber particle size ranges from about 0.5 microns to about 8 microns in size; preferably from about 1.0 micron to about 2.5 microns, more preferably from about 1 to about 2.0 micron; and most preferably from about 1.5 micron to about 2.0 microns. As is known to those skilled in the art, the particle size of the rubber particles are generally controlled by the applied shear rate, heat, pressure, or a combination of these factors, during the stage of inversion of the polymerization when polystyrene becomes the continuous phase.

Suitable rubber modified polystyrene particles are commercially available. Preferred among the commercial products of medium and high impact polystyrene are 5500, 5210, 4211, all available from NOVA Chemicals Inc., 5100 Bainbridge Boulevard, Chesapeake, Va. 23320.

The rubber modified polystyrene particles may be in bead or pellet form and may include the customary ingredients and additives, such as pigments, colorants, plasticizers, mold release agents, stabilizers, ultraviolet light absorbers, and so on. Typical pigments include, without limitation, inorganic pigments such as carbon black, zinc oxide, titanium dioxide, and iron oxide, as well as organic pigments such as quinacridone reds and violets and copper phthalocyanine blues and greens.

In a further preferred embodiment of the invention, the thermoplastic film is comprised of general solid polystyrene, which also is available from NOVA Chemicals Inc., Beaver Valley Plant, Monaca, Pa.

The thermoplastic film may be formed via an extrusion process or a blow molding process. Molding conditions may be the same as conditions usually employed for molding impact modified polystyrenes. Preferably, the thermoplastic film of the invention is extruded from a slot or a circulate die.

Preferably, the thermoplastic film has an IZOD impact value ranging from about 50 to about 100 J/M and an impact resistance greater than 1.0 ft-lb/inch.

The thermoplastic container can be a polystyrene cup that is fabricated by a conventional cup-forming machine that has an inner shell and an outer shell, for example, Cup Production MODEL 6-VLC-125 machine, made by Autonational B.V.

In one embodiment of the invention, after the cup or cups are molded, the thermoplastic film is formed into a cylinder and inserted into the cup, which, in turn is carried by a mandrel. The inner shell is inserted into the cup, and heat and pressure is applied to the thermoplastic film to fuse the film to the inner surface of the sidewall of the cup. The pressure for the inner shell against the thermoplastic film ranges from about 20 to about 80 pounds per square inch, preferably from about 30 to about 50 pounds per square inch (psi).

The fabrication rate for the film fusing operation for a single machine producing 10-ounce cups ranges from about 18 to 120 cups per minute. Several machines can be used to increase the production rate. Heat is applied to the thermoplastic film by means of steam in order to melt the thermoplastic film and the adjacent polystyrene beads so that a cohesive effect occurs between the inner surface of the sidewall of the cup and the thermoplastic film. The temperature and time for this cohesion to occur may vary, for example, from about 60° C. to about 120° C. for about 3 to about 20 seconds.

It has been found that the thermoplastic film also increases the rim strength of the container, which, in effect, increases the overall strength of the container. The rim strength is a measure of the force required (in kilograms) to cause the rim to crumble a one-fourth inch displacement from the opened edge of the container.

Other embodiments of the invention involve the thermoplastic film being fused to the inner and/or outer surfaces of the sidewall and/or fused to the inner and/or outer surfaces of the base of the container.

The invention is further illustrated, but not limited by, the following examples wherein all parts and percentages are by weight unless otherwise specified.

EXAMPLES

Example 1

This example illustrates the preparation of thermoplastic film lined containers. The NOVA Chemicals F271TU (expandable polystyrene) cup beads blended with zinc stearate were pre-expanded in an 11-gallon Rodman Steam pre-expander (Artisan Industries Inc.) at atmospheric pressure. The pre-expansion was operated batch wise. The weight of the cup beads (i.e. 3.5 lbs.) was adjusted to make a pre-puff with a density ranging between 2.6-3.6 pounds per cubic foot (pcf). The newly prepared pre-puff was air dried for 5 minutes to remove the moisture and was allowed to age for about 4 hours before molding.

Six-ounce standard cups using different density aged pre-puff beads were molded. The steam header pressure used was 80 pounds per square inch (psi) and the total cycle time was in the range of 7.50 to 8.25 seconds. The molded cups were allowed to age overnight.

Pre-cut extruded polystyrene film (1.0 mil thick) made from NOVA Chemical PS 2110 (general solid polystyrene) resin was fused onto the inner surface of the sidewall of the cups in the same molder used for forming the cups. The header steam pressure used in the film fusion process was 45 pounds per square inch and the total cycle time was 5.55 seconds. The film-lined containers were stored overnight before testing.

The cups with the varying density pre-puff beads, i.e. 3.47, 3.54, 3.21, and 2.61 pcf, were tested by the following method: Spicy oil at room temperature was poured into each container up to around 80% of the cup's height. The outside wall of each container containing the spicy oil was observed for oil stains and leakage every 10 minutes over the first 1.5 hours, every 30 minutes in the time period from 1.5 hours to 6 hours, and, then, every hour up to a total of 48 hours.

The average time failure (ATF) for each cup group sampling was calculated by adding the time to failure for each container, and dividing the total time by the number of containers tested. Typically, ten cups of each group sampling were tested. The maximum ATF value of 48 hours represents that none of the cups for each cup group sampling exhibited any stain or leakage. The minimum ATF value of 0.17 hours represents that all of the cups in each of cup group sampling failed within the first 10 minutes.

Each cup in each group sampling was tested for rim strength with and without a thermoplastic film and the average force was recorded. Ten cups were tested in each group sampling.

The results for the oil retention and the rim strength are shown in Table 1. As indicated in Table 1, the cup samples with the thermoplastic film of the invention have an increased ATF and rim strength compared to the cup sample without the thermoplastic film.

TABLE 1

| Pre-puff density (pcf) | 3.47 | 3.54 | 3.21 | 2.61 | 3.47 | 3.54 | 3.21 | 2.61 |
|---|---|---|---|---|---|---|---|---|
| Film-lined | Yes | Yes | Yes | Yes | No | No | No | No |
| ATF (hour) | 48 | 48 | 48 | 48 | 0.78 | 0.83 | 0.83 | 0.83 |
| Rim strength (kg) | 0.55 | 0.57 | 0.53 | 0.42 | 0.29 | 0.30 | 0.25 | 0.19 |

Example 2

The oil retention testing and the rim strength testing for cups with a pre-puff density of 3.47 pcf were performed in a manner similar to that of Example 1. These results are shown in Table 2. The polystyrene film was similar to that used in Example 1 and its thickness varied as shown in Table 2. As indicated in Table 2, the cup samples with the thermoplastic film of the invention have an increased ATF and rim strength compared to the cup samples without the thermoplastic film.

TABLE 2

| Pre-puff density (pcf) | 3.47 | 3.47 | 3.47 |
|---|---|---|---|
| Film thickness (mil) | 0.0 | 1.0 | 1.5 |
| ATF (hour) | 0.78 | 48 | 48 |
| Rim strength (kg) | 0.29 | 0.55 | 0.59 |

Example 3

The oil retention testing and the rim strength testing for cups with a pre-puff density of 3.50 pcf were performed in a manner similar to that of Example 1. The thermoplastic film was similar to that used in Example 1 and was either extruded or blown as indicated in Table 3. The volume of the EPS cups was changed from 6 ounces to 16 ounces. The results are shown in Table 3. The samples with the thermoplastic film fabricated via an extrusion or a blown process have comparable testing results. Also, the samples with the thermoplastic film of the invention regardless of the process for making the thermoplastic film have an increased ATF and rim strength compared to the samples without the thermoplastic film.

TABLE 3

| Pre-puff density (pcf) | 3.50 | 3.50 | 3.50 |
|---|---|---|---|
| Film thickness (mil) | 0 | 1.0 | 1.0 |
| Process of making PS film | No film | Extrusion | Blown |
| ATF (hour) | 0.83 | 31 | 48 |
| Rim strength (kg) | 0.35 | 0.56 | 0.54 |

Example 4

In this Example, the polystyrene resin film was replaced with the thermoplastic materials indicated therein. NOVA PS 3500, 4211, 5500, and 5102 are the medium and high impact polystyrenes, all of which are discussed hereinabove. As is indicated in Table 4, the cup samples with the thermoplastic film fabricated from the different thermoplastic materials have comparable ATF and rim strength values.

TABLE 4

| Pre-puff density (pcf) | 3.50 | 3.50 | 3.50 | 3.50 |
|---|---|---|---|---|
| Film thickness (mil) | 1.0 | 1.0 | 1.0 | 1.0 |
| NOVA PS resin | 3500 | 4211 | 5500 | 5120 |
| ATF (hour) | 48 | 38 | 48 | 48 |
| Rim strength (kg) | 0.56 | 0.52 | 0.49 | 0.47 |

The cups with the fused thermoplastic film of the above Examples have a generally uniform "rough" or "bumpy" inner sidewall surface. This is due in part to the fact that the film material when fused against the sidewall of the cup covers the voids formed by the expanded polystyrene beads during the mold processing of the cups and the applied temperature for this "fusing" process causes the expanded polystyrene beads to expand even further.

The thermoplastic container is used for retaining pre-packaged foods, e.g. instant noodles, soups, stews, chicken that are sold on the shelves in the grocery stores. The container can be placed in the freezer, or in the microwave for reheating purposes without lessening the integrity of the container.

While the present invention has been set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A container for retaining liquid and/or food that contains oil and/or fatty components, comprising:
    a molded container formed in a molding process from expandable particles consisting of polystyrene, a blowing agent, and one or more additives selected from the group consisting of pigments, colorants, plasticizers, mold release agents, stabilizers, and ultraviolet light absorbers, and having a sidewall with an inner surface and an outer surface and a base with an inner surface and an outer surface;
    said sidewall having voids formed by said expandable particles upon expansion of said expandable particles in said molding process for the forming of said container, and
    a thermoplastic film encircled around and fused to said inner surface of said sidewall of said container to cover said voids in said sidewall and to further expand said particles to prevent said liquid and/or said oil and/or fat components of said food from flowing into the voids in said inner surface of said sidewall, through said sidewall, and out onto said outer surface of said sidewall of said container.

2. A container of claim 1 wherein said thermoplastic film has a thickness ranging from about 0.10 mil to about 5.0 mils.

3. A container of claim 1 wherein said thermoplastic film is fused to said base of said container.

4. A container of claim 1 wherein said thermoplastic film has an IZOD impact value ranging from about 50 to about 100 J/M.

5. A container of claim 1 wherein said thermoplastic film has an impact resistance greater than 1.0 ft. lb/inch.

6. A container of claim 1 wherein said thermoplastic film is made of a polymer selected from the group consisting of solid polystyrene, rubber modified polystyrene, polymethyl methacrylate, polypropylene, polyethylene, polyethylene terephthalate (PET), and mixtures thereof.

7. A container of claim 6 wherein said thermoplastic film is made of a polymer selected from the group consisting of solid polystyrene and rubber modified polystyrene.

8. A container of claim 7 wherein said thermoplastic film is made of solid polystyrene.

9. A molded container suitable for retaining liquid and/or food that contains oil and/or fatty components, said container comprising:
    a sidewall with an inner surface and an outer surface and a base, and molded from expandable particles consisting of polystyrene, a blowing agent and one or more additives selected from the group consisting of pigments, colorants, plasticizers, mold release agents, stabilizers, and ultraviolet light absorbers, and said sidewall having voids formed by said expandable particles in said molding process, and
    a thermoplastic film that has an impact resistance greater than 1.0 ft. lb/inch encircled around and fused to said inner surface of said sidewall to cover said voids and to further expand said particles for preventing the liquid and/or oil and/or fatty components of said food from flowing into said voids in said inner surface of said sidewall of said container, through said sidewall, and out onto the outer surface of said container, and for increasing the strength of said container.

* * * * *